United States Patent [19]
Knauss et al.

[11] Patent Number: 5,993,544
[45] Date of Patent: Nov. 30, 1999

[54] NON-LINEAR OPTICAL THIN FILM LAYER SYSTEM

[75] Inventors: Lee A. Knauss, Bowie; Kolagani S. Harshavardhan, Silver Spring, both of Md.

[73] Assignee: Neocera, Inc., Beltsville, Md.

[21] Appl. No.: 09/050,049

[22] Filed: Mar. 30, 1998

[51] Int. Cl.$^6$ ........................................................ B23B 9/00
[52] U.S. Cl. ........................... 117/94; 117/95; 117/97; 117/106; 117/92; 428/700; 428/701; 428/702; 428/446; 257/613
[58] Field of Search ....................... 117/94, 95, 97, 117/92, 106; 428/700, 701, 702, 446; 257/613

[56] References Cited

U.S. PATENT DOCUMENTS

| 5,294,564 | 3/1994 | Karapiperis et al. | 437/81 |
| 5,514,484 | 5/1996 | Nashimoto | 117/948 |
| 5,620,739 | 4/1997 | Azuma et al. | 427/97 |
| 5,624,229 | 4/1997 | Leplingard et al. | 117/106 |
| 5,635,453 | 6/1997 | Pique et al. . | |
| 5,759,265 | 6/1998 | Nashimoto et al. | 117/948 |

FOREIGN PATENT DOCUMENTS

| 7-330487 | 12/1995 | Japan | 117/94 |

OTHER PUBLICATIONS

D.K. Fork, in *Pulsed Laser Deposition of Thin Films*, edited by Douglas B. Chrisey and Graham K. Hubler (Wiley, New York, 1994), pp. 407–412.

C.M. Cotell and R.E. Leuchtner, Mater.Res. Soc. Symp. Proc., 285, 367–372 (1993).

S. Yilmaz, T. Venkatesan and R. Gerhard–Multhaupt, *Appl. Phys. Lett.* 58, 2479–2481 (1991).

Masuda et al., "Highly orineted Pb(Zr, Ti) O3 thin films prepared by pulsed laser ablation on GaAs and Si substrates with MgO buffer layer", Japanese Journal of Applied Physics part 1, vol. 34 (9B) pp. 5154–7, 1995.

*Primary Examiner*—Robert Kunemund
*Attorney, Agent, or Firm*—Rosenberg, Klein & Bilker

[57] ABSTRACT

A non-linear optical thin film layer system (10) is provided for integrated optics applications where a non-linear optical thin film layer (18) is integrated with a gallium-arsenide substrate (12). A first encapsulating layer (20) is deposited on lower surface (26), peripheral sides (30), and an upper surface peripheral region (28) of said gallium-arsenide substrate (12). A second encapsulating and buffer layer (14) is epitaxially grown on an upper surface of said gallium-arsenide substrate (12) and on the encapsulated upper surface peripheral region (28) of said gallium-arsenide substrate (12). A perovskite layer (16) is epitaxially grown on an upper surface of the layer (14). A non-linear optical thin film layer (18) is epitaxially grown on an upper surface of the perovskite layer (16) and is lattice matched to this layer.

15 Claims, 2 Drawing Sheets

NON-LINEAR OPTICAL THIN FILM LAYER SYSTEM

BACKGROUND OF THE INVENTION

1. Field of the Invention

This invention relates to non-linear optical components forming the basic building blocks of information technology of the future. Non-linear optical thin films formed on gallium arsenide, aluminum gallium arsenide, indium gallium arsenide, and Si semi-conducting substrates have many potential applications in integrated optics. With this technology, semi-conducting diode lasers, non-linear optical devices such as spatial light modulators, frequency doubling second harmonic generators, and photodiode detectors can all be integrated on the same semi-conductor substrate, which has been found to enhance system performance while simultaneously lowering the cost of production and manufacture.

Practical applications of promising non-linear optical thin film device technology for integrated optics critically depends on the successful development of non-linear optical thin films with desirable optical properties. These films must exhibit a high degree of structural and compositional quality since these properties directly aid in providing the desired non-linear electro-optic properties. To this end, the invention described herein is directed to a non-linear optical thin film layer system and a method for producing the same.

In particular, this invention pertains to the integration of a non-linear optical thin film layer having a gallium-arsenide substrate. Still further, this invention relates to a non-linear optical thin film layer system in which the non-linear optical thin film layer is integrated with an encapsulated gallium-arsenide substrate, where the encapsulation provides a chemical barrier against arsenic contamination of the non-linear optical thin film layer.

Still further, this invention relates to a non-linear optical thin film layer which is integrated with an encapsulated gallium-arsenide substrate through a plurality of epitaxially grown and contiguously interfacing transitional buffer layers, where the buffer layers define a lattice constant matching criteria between a lattice constant of the encapsulated gallium-arsenide substrate and the lattice constant of the non-linear optical thin film layer.

Further, this invention directs itself to a non-linear optical thin film layer system which provides for a gallium-arsenide substrate having a contiguously interfacing encapsulating layer deposited on the lower surface, peripheral sides, and upper surface peripheral region of the gallium-arsenide substrate.

Additionally, the non-linear optical thin film layer system includes a second encapsulating layer and buffer layer epitaxially grown and contiguously interfacing with the exposed upper surface of the gallium-arsenide substrate and the encapsulated upper surface peripheral region of the gallium-arsenide substrate. A second buffer layer is epitaxially deposited on an upper surface of the second encapsulating layer/buffer layer whereby the second encapsulating layer/buffer layer and second buffer layer provide a monotonically decreasing lattice constant which approximates, at the second buffer layer, the lattice constant of the non-linear optical thin film layer deposited thereon.

Still further, this invention pertains to a pair of first and second encapsulating layers which prevent arsenic contamination of a non-linear optical thin film layer deposited at temperatures above the dissociation temperature of the gallium-arsenide substrate. Additionally, this invention describes a non-linear optical thin film system incorporating a plurality of layers formed on a gallium-arsenide substrate where at least a pair of first and second encapsulating layers hermetically seal the gallium-arsenide substrate from an external environment.

2. Prior Art

In the prior art, deposition of epitaxial ferroelectric optical materials, particularly oxides, on gallium-arsenide substrates for use in systems has been addressed. In some prior art techniques, a magnesium oxide composition layer is suggested for use as a buffer layer between the gallium-arsenide substrate and a ferroelectric oxide composition. It is known that precautions must be taken to avoid arsenic contamination once the wafer has been capped with a magnesium oxide composition layer. However, such prior art fails to show or suggest the use of an encapsulating layer to contiguously encapsulate the lower surface, side surfaces, and upper surface peripheral regions of a gallium-arsenide substrate for minimizing contamination. Additionally, such prior art does not show or suggest that an encapsulating layer may advantageously be formed of silicon nitride.

Further, such prior art fails to disclose or suggest deposition of a magnesium oxide composition layer on the upper surface of the gallium-arsenide substrate including deposition over an encapsulated peripheral region of the substrate's upper surface.

Additionally, such prior art does not teach or suggest the deposition of a second buffer layer on the magnesium oxide layer for the purposes of lattice matching between layers and for covering defects in the magnesium oxide composition layer. Even further, the description fails to suggest the particular optical non-linear thin film layer compositions of the present invention.

In a prior art Publication entitled "Phase Composition and Microstructure as a Function of Deposition Conditions for Potassium Titanate Niobate Thin Films Grown by Pulse Laser Deposition," by Cotell and Leuchtner, there is provided a description of pulse laser deposition of potassium tantalate niobate (KTN) films on magnesium oxide substrates using segmented targets consisting of KTN and potassium nitrate. The disclosure made by this prior art Publication fails to show or suggest any integration with a gallium-arsenide substrate, the encapsulation of such a substrate to prevent arsenic contamination of the optical thin film, the use of a strontium titanate buffering layer, or a combination of these elements for the purposes and objectives of the subject invention concept.

A further prior art Publication entitled "Pulsed Laser Deposition of Stoichiometric Potassium-Tantalate-Niobate Films from Segmented Evaporation Targets," by Yilmaz, Venkatesan, and Gerhard-Multhaupt, discusses the preparation of epitaxial KTN films on strontium-titanate substrates by means of pulse laser deposition. Absent from this disclosure are any teachings with respect to the integration of the non-linear optical thin film layer with an encapsulated gallium-arsenide substrate (or indeed a gallium-arsenide substrate without encapsulation), the use of a metal oxide buffering and encapsulating layer, or a combination of these elements commensurate with the present invention.

Further, the prior art fails to show or suggest the combination of composition layers comprising the non-linear optical thin film layer system to which the present invention is directed. Even further, the prior art fails to show or suggest the particular method steps, and their combination, for producing the non-linear optical thin film layer system to which the present invention is directed. For example, the prior art fails to show or suggest the particular steps for depositing the various layer compositions in the non-linear optical thin film layer system of the present invention, and further fails to teach or suggest the important cooling step required subsequent to the high temperature deposition of the non-linear optical thin film layer.

By encapsulating the gallium-arsenide substrate using first and second encapsulating layers, it has been found that the high temperature epitaxial deposition of a non-linear optical thin film layer can result in a high quality optical thin film which exhibits the desired non-linear optical properties for use in an integrated optics system. These encapsulating layers, which prevent arsenic contamination of the optical thin film layer, are used in the present invention in combination with lattice matching buffering layers to provide an excellent growth template on which a highly oriented, high quality, non-linear optical thin film layer may be deposited at high temperatures.

SUMMARY OF THE INVENTION

This invention provides for a non-linear optical thin film layer system having a non-linear optical thin film layer integrated with a gallium-arsenide substrate. Encapsulating layers deposited on the gallium-arsenide substrate serve as a chemical barrier to prevent arsenic contamination of the non-linear optical thin film layer subsequently deposited at high temperatures. The non-linear optical thin film layer system includes a plurality of epitaxially grown and contiguously interfacing perovskite compound buffer layers deposited between the encapsulated gallium-arsenide substrate and the non-linear optical thin film layer which is deposited at high temperature.

DESCRIPTION OF THE PREFERRED EMBODIMENTS

Figure 1:
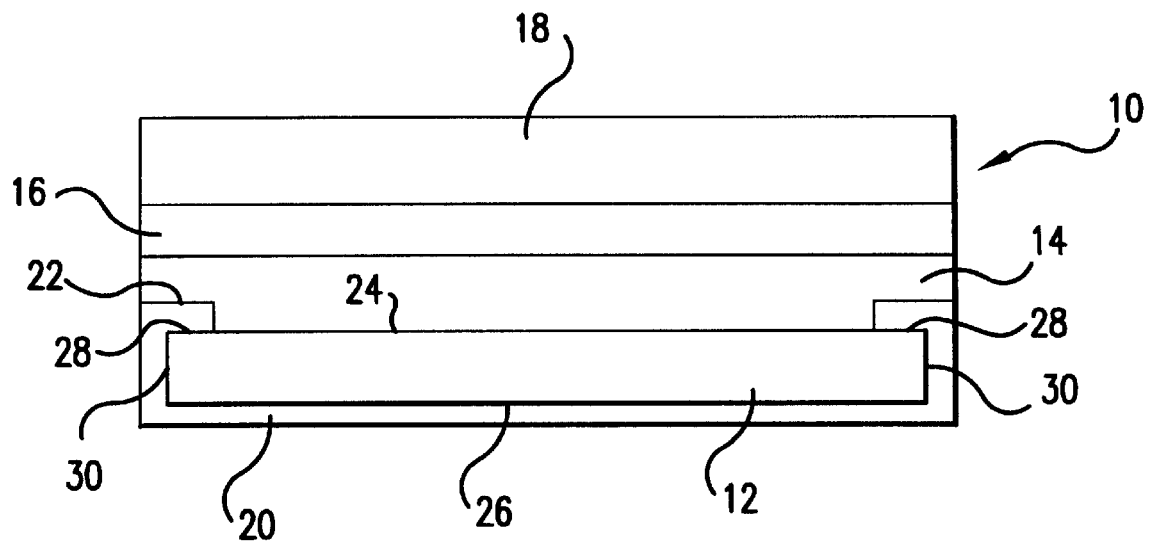
FIG. 1 is a schematic view of the non-linear optical thin layer system showing a gallium arsenide substrate and a non-linear optical thin film layer integrated therewith; and, FIG. 2 is a block flow diagram depicting the method steps in forming the non-linear optical thin film layer system.

Referring now to FIG. 1, there is shown a non-linear optical thin film layer system 10 for integration of non-linear optical thin film layer 18 with a gallium arsenide substrate 12 for use in an integrated optics application. Such integrated optics applications allow for the mounting and use of semiconducting diode lasers, spatial light modulators, frequency doubling second harmonic generators, and photodiode detectors which can all be integrated with the same gallium arsenide (GaAs) substrate. In addition to integrating optical thin film layers with a GaAs substrate, through use of the methods and compositions herein described, optical thin film layers may be integrated on aluminum gallium arsenide and indium gallium arsenide substrates. The non-linear optical thin film layer 18 referred to with respect to the inventive concept herein described includes compounds within the families of strontium barium niobate (SBN), potassium-tantalate-niobate (KTN), and lithium niobate with KTN being the preferred composition layer of the subject invention.

In the fabrication of such integrated optical systems, it is important that the non-linear optical thin films 18 created, possess a high degree of structural and compositional quality since these properties directly lead to their desired non-linear optical properties. However, the GaAs substrate 12 is generally incompatible with the process of growing the non-linear optical thin film 18 thereon, and the substrate 12 is also incompatible with the optical thin film 18 itself. Incompatibility arises due to the fact that a lattice constant mismatch exists between the GaAs substrate 12, having a lattice constant of approximately 5.65 Å and the optical thin film layer 18 having a lattice constant of approximately 4 Å, which, without correction, causes undesirable orientations between the substrate and the optical thin film layer. Additionally, the GaAs substrate 12 is incompatible with the high growth temperatures required for the deposition of the optical thin film layer 18 thereover; these growth temperatures typically range between 750° C. and 800° C., however, Arsenic begins to dissociate from the GaAs substrate at deposition temperatures in excess of 600° C. Thus, at such high deposition temperatures for the optical thin film layer 18, arsenic dissociating from all of the surfaces of the GaAs substrate 12, contaminates the deposited optical thin film layer 18, and prevents the growth of high optical quality thin film layers.

It is thus an object of this invention to develop a non-linear optical thin film layer system for use in an integrated optics system whereby these incompatibilities are overcome and in which a high quality non-linear optical thin film layer 18 is successfully integrated with the GaAs substrate 12. In order to overcome lattice mismatch between the GaAs substrate 12 and the thin film optical layer 18, lattice matching buffer layers are deposited between the GaAs substrate 12 and the optical thin film layer 18. Further, in order to avoid arsenic contamination of the optical thin film layer 18, the GaAs substrate is completely encapsulated prior to the high temperature deposition of the optical thin film layer 18 thereon, whereby this encapsulating layer hermetically seals the GaAs substrate 12 and further serves as a chemical barrier to any arsenic contamination of the optical thin film layer 18.

Embodying the goals and objects of this invention is the non-linear optical thin film layer system 10 shown in FIG. 1, which includes an encapsulated GaAs substrate 12 integrated with a non-linear optical thin film layer 18. The GaAs substrate 12 has a lower surface 26, peripheral sides 30, and an upper surface partitioned into two adjacent regions; an inner region 24 and a peripheral region 28. A contiguously interfacing layer of silicon nitride ($Si_3N_4$), 20, encapsulates the lower surface 26, peripheral sides 30, and upper surface peripheral region 28 of GaAs substrate 12.

A magnesium oxide (MgO) layer 14 is epitaxially deposited over, and contiguous with, both the upper surface inner region 24 of said GaAs substrate and the encapsulated peripheral region 28.

As is depicted in the Figure, all of the surfaces of the GaAs substrate 12 are completely and contiguously encapsulated by the combination of the silicon nitride and magnesium oxide encapsulating layers 20 and 14, respectively. This complete encapsulation hermetically seals the GaAs substrate from the external environment, and in particular, prevents arsenic contamination of the subsequently deposited optical-thin film layer 18 thereover, which high temperature deposition occurs at temperatures, typically at 750° C., in excess of the dissociation temperature of the GaAs substrate 12 which approximates 600° C.

Significantly, the contiguously interfacing silicon nitride encapsulating layer 20 extends continuously along the lower surface 26, peripheral sides 30, and peripheral upper surface region 28 of the GaAs substrate 12. This particular configuration of the encapsulating silicon nitride layer 20, which includes encapsulation of the peripheral sides 30 and upper surface peripheral region 28 of the GaAs substrate 12, when combined with the encapsulating magnesium oxide layer 14 as shown, serves as an excellent chemical barrier against arsenic contamination of the optical thin film layer 18 from all surfaces 26, 30, 28 and 24 of the GaAs substrate 12.

Magnesium oxide layer 14, together with the silicon nitride layer 20 encapsulates the GaAs substrate 12, thus serving as a chemical barrier to arsenic contamination of subsequently deposited optical thin film layer 18, as previously described. Additionally, use of magnesium oxide layer 14, having a lattice constant of approximately 4.2 Å, provides lattice constant matching between the GaAs substrate upper surface and the overlying optical thin film layer 18. Still further, magnesium oxide layer 14, having a relatively low index of refraction on the order of n=1.7, acts as an optical cladding, or wave guiding, layer which is necessary for the optical applications envisioned for the non-linear optical thin film layer system 10.

A relatively thin strontium-titanate layer 16 is epitaxially deposited on the upper surface of the magnesium oxide layer 14. The purpose of this layer is primarily two-fold. First, the strontium titanate layer 16, together with the underlying magnesium oxide layer 14, forms a contiguously interfacing perovskite compound buffer layer with a monotonically decreasing lattice constant which provides overall lattice matching between the GaAs substrate 12 and the optical thin film layer 18. Stated otherwise, the strontium-titanate layer 16 provides a highly favorable growth template for the high temperature deposition of the optical thin film layer 18 which allows for highly oriented structures of the optical thin film layer, thus resulting in enhanced optical qualities of the optical thin film layer 18. The strontium titanate layer 16 also covers any defects that are present in the upper surface of the magnesium oxide layer 14, which further improves the growth template for the subsequently deposited optical thin film layer 18.

Non-linear optical thin film layer 18, preferably formed of KTN, is shown epitaxially deposited on the upper surface of the strontium-titanate layer 16 in the Figure. A prototypical KTN composition would have the stoichiometric formula $KTa_{1-x}Nb_xO_3$, with x=0.48. The high temperature epitaxial growth of high quality non-linear optical thin film layer 18 is possible because the lattice matching buffer layers 14 and 16 provide an excellent epitaxial growth template for the optical thin film layer 18, and additionally, arsenic contamination of optical thin film layer 18 is prevented through the use of the previously described encapsulating silicon nitride 20 and magnesium oxide 14 layers.

Figure 2:
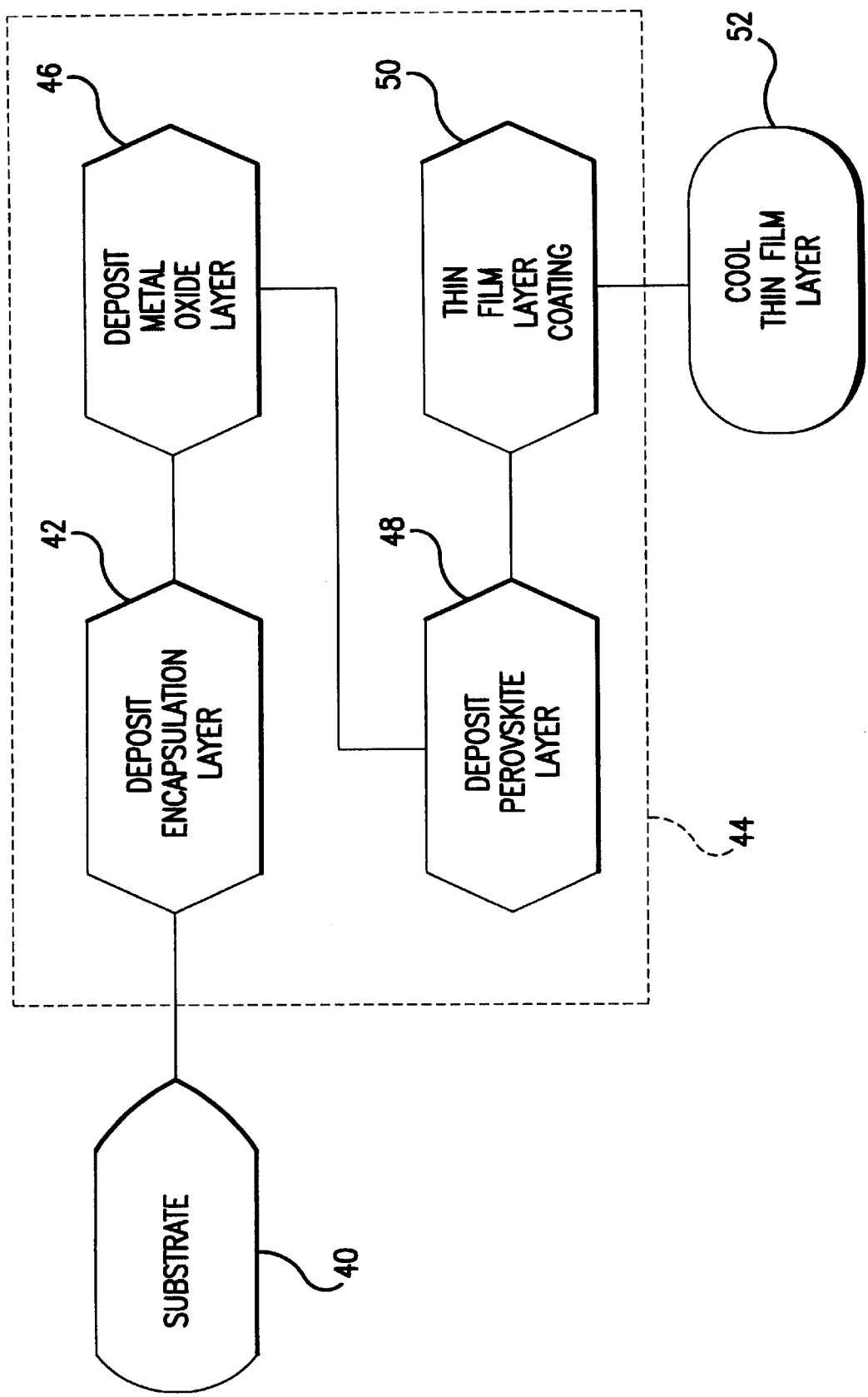

The method for forming the non-linear optical thin film layer system described in FIG. 1 is shown in FIG. 2 which is a flow block diagram of the method as herein described. The method is initiated with the step of establishing or providing the GaAs substrate 12 as seen in block 40.

GaAs substrate 12 is then coated, as depicted in block 42, with silicon nitride encapsulating layer 20 using a pulse laser deposition technique which is depicted in block 44, encompassing a number of the other steps in the subject method. Typically, the pulse laser deposition techniques for depositing this encapsulating layer proceed as a two-step process. Initially, GaAs substrate 12 is mounted such that its upper surface, upon which the magnesium oxide will subsequently be deposited, is mounted flush against a substrate mounting support. By mounting GaAs substrate 12 in this manner, the upper surface of GaAs substrate 12 is hidden from the pulse laser, however, the lower surface 26 and peripheral sides 30 of the GaAs substrate 12 are exposed to the pulse laser deposition process. Pulse laser deposition of the thus exposed lower surface 26 and peripheral sides 30 of the GaAs substrate 12 is effected at approximately room temperature within a pulse laser deposition chamber environment containing a small amount of inert gas, such as argon, or nitrogen, to insure scattering of the silicon nitride molecules during the deposition process, ensuring enhanced side coverage or coating of the peripheral sides 30 of the GaAs substrate 12.

Subsequent to the lower surface 26 and peripheral sides 30 of the GaAs substrate 12 having been coated with silicon nitride, GaAs substrate 12 is flipped-over such that its coated lower surface 26 rests flat against the mounting support for the GaAs substrate, thus exposing, the as yet uncoated, upper surface to the deposition process. The upper surface inner region 24 of the GaAs substrate 12, now exposed, is masked, using a square of aluminum foil, or some like material. After masking of the inner region 24, only the upper surface peripheral edge region 28 and peripheral sides 30 of the GaAs substrate 12 remain exposed to the pulse laser deposition process.

The silicon nitride deposition process described previously is now repeated to ensure that both the exposed peripheral sides 30 and upper surface peripheral region 28 of the GaAs substrate 12 are sealed by the contiguous silicon nitride encapsulant layer 20 forming a shoulder region 22 as shown in FIG. 1. The square aluminum foil mask insured that the inner region 24 of the GaAs substrate's upper surface remained uncoated, so that it is now ready to accept deposition of the magnesium oxide layer 14 thereon. The preceding steps of depositing the silicon nitride encapsulating layer on the GaAs substrate may be effected using well-known chemical vapor deposition techniques as an alternative to pulse laser deposition.

The next step involves the epitaxial deposition of the magnesium oxide layer 14 on the inner region 24 of the GaAs substrate 12 and the encapsulated peripheral region 28 of the GaAs substrate 12 as depicted by block 46 of FIG. 2. In this step, the GaAs substrate 12, encapsulated in the silicon nitride layer 20, is attached to a heater with silver paste, and with the uncoated GaAs inner region 24 facing away from the heat, thus exposing it to the deposition process so that it may be coated with the magnesium oxide. The GaAs substrate is heated to a temperature of approximately 550° C. at which temperature magnesium oxide is deposited using pulse laser deposition in a deposition chamber environment having a vacuum of $\sim 10^{-6}$ Torr. No oxygen partial pressure is required.

Once the magnesium oxide layer 14 has been deposited, the temperature of the encapsulated GaAs substrate 12 is raised to 750° C., at which temperature a thin layer of a perovskite composition such as strontium titanate is epitaxially deposited on the upper surface of the magnesium oxide layer 14, as shown in block 48, again by pulse laser deposition. This deposition is performed in an oxygen environment having a partial pressure of approximately 200 mTorr of oxygen.

Next, as shown in block 50, the non-linear optical thin film layer of KTN is deposited on the upper surface of the strontium-titanate layer 16 using pulse laser deposition. As in the previous deposition step, the KTN layer 18 is epitaxially deposited while the temperature of the substrate is maintained at approximately 750° C., in an environment having an oxygen partial pressure of approximately 200 mTorr. The previously deposited encapsulating layers of magnesium oxide and silicon nitride prevent arsenic contamination of the KTN layer 18 during this high temperature deposition step. Further, the growth of a high quality optical thin film layer 18 of KTN is enhanced by the growth template provided by the underlying strontium-titanate layer 16.

Once the KTN layer 18 has been epitaxially deposited by pulse laser deposition at a temperature of 750° C., to insure the high optical quality of the optical thin film KTN layer 18, it is critical that the system 10 be subject to a precisely controlled cooling environment which obviates excessive stresses and resultant cracking in the deposited KTN film layer 18. This cooling step shown by block 52 includes cooling the pulse laser deposited optical thin film layer 18 of KTN at a cooling rate of less than 20° C. per minute in an environment having an oxygen partial pressure of less than 100 mTorr.

It has been determined experimentally that the highest quality stoichiometric optical thin film layer 18 of KTN can be deposited using pulse laser deposition by utilizing a segmented KTN target to provide additional potassium to the optical thin film. Particularly, the segmented target used in the deposition process includes both KTN and potassium nitrate, which provides extra potassium to maintain the stoichiometric potassium requirements of the deposited optical thin film layer of KTN.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is claimed is:

1. A non-linear optical thin film layer system for use in an integrated optical system, comprising:
   (a) a GaAs substrate having an upper surface and a lower surface, said upper surface having an inner region and a peripheral region;
   (b) an encapsulating layer deposited on said gallium arsenide lower surface and said peripheral region of said gallium arsenide upper surface;
   (c) a metal oxide composition layer deposited on said inner region of said gallium arsenide substrate inner region and said encapsulated peripheral region;
   (d) a perovskite layer composition epitaxially deposited on an upper surface of said metal oxide composition, said metal oxide composition layer and said perovskite layer composition forming buffering layer compositions having monotonically decreasing lattice constants; and,
   (e) a non-linear optical film layer epitaxially deposited on said perovskite layer.

2. The non-linear optical thin film layer system as recited in claim 1 where said encapsulating layer is formed contiguous to said gallium arsenide lower surface and said gallium arsenide upper surface peripheral region.

3. The non-linear optical thin film layer system as recited in claim 2 where said metal oxide composition and said encapsulating layer completely encapsulates said gallium arsenide substrate.

4. The non-linear optical thin film layer system as recited in claim 3 where said metal oxide composition and said encapsulating layer hermetically seal said gallium arsenide substrate from an external environment.

5. The non-linear optical thin film layer system as recited in claim 2 where said encapsulating layer is formed of silicon nitride.

6. The non-linear optical thin film layer system as recited in claim 1, where said metal oxide composition is formed of magnesium oxide.

7. The non-linear optical thin film layer system as recited in claim 1, where said perovskite layer composition is formed of $SrTiO_3$.

8. The non-linear optical thin film layer system as recited in claim 1, where said non-linear optical thin film layer is formed of a potassium-tantalate-niobate composition.

9. A method for forming a non-linear optical thin film layer system for use in an integrated optical system, comprising the steps of:
   (a) establishing a gallium arsenide substrate having an upper surface and a lower surface, said upper surface having an inner region and a peripheral region;
   (b) depositing an encapsulating layer on said gallium arsenide lower surface and said peripheral region of said gallium arsenide upper surface;
   (c) depositing a metal oxide composition layer on said inner region of said GaAs substrate inner region and said encapsulated peripheral region;
   (d) epitaxially depositing a perovskite layer composition on an upper surface of said metal oxide composition layer, said metal oxide composition layer and said perovskite layer composition forming buffering layer compositions having monotonically decreasing lattice constants; and,
   (e) epitaxially depositing a non-linear optical thin film layer on said perovskite layer composition.

10. The method of forming a non-linear optical thin film layer system as recited in claim 9, where the steps of depositing said metal oxide composition layer, said perovskite layer composition and said non-linear optical thin film layer, includes the step of pulse laser depositing.

11. The method of forming a non-linear optical thin film layer system as recited in claim 10, where the step of pulse laser depositing said non-linear optical thin film layer includes the step of establishing a pulse laser deposition environment of approximately 750 degrees–800 degrees C. at an oxygen partial pressure of approximately 200 mTorr.

12. The method of forming a non-linear optical thin film layer system as recited in claim 11, where the step of pulse laser depositing said non-linear optical thin film layer includes the step of cooling said pulse laser deposited optical thin film layer at a cooling rate of less than 20 degrees C. per minute in an environment having an oxygen partial pressure of less than 100 mTorr.

13. The method of forming a non-linear optical thin film layer system as recited in claim 12, where said non-linear optical thin film layer is formed of a potassium-tantalate-niobate composition.

14. The method of forming a non-linear optical thin film layer system as recited in claim 13, where said metal oxide composition is formed of magnesium oxide.

15. The method of forming a non-linear optical thin film layer system as recited in claim 14, where said perovskite layer composition is formed of $SrTiO_3$.

* * * * *